United States Patent [19]
Gunther

[11] 3,892,590
[45] July 1, 1975

[54] CATHODE MATERIAL FOR USE IN NON-AQUEOUS ELECTROLYTES

[75] Inventor: Ronald G. Gunther, Mystic, Conn.

[73] Assignee: Yardney International Corporation, Los Angeles, Calif.

[22] Filed: July 16, 1973

[21] Appl. No.: 379,257

[52] U.S. Cl............. 136/83 R; 136/100 R; 136/121
[51] Int. Cl.................. H01m 13/02; H01m 17/00
[58] Field of Search............................ 136/120–122, 136/6 R, 6 LN, 22, 20, 83 R, 100 R, 107, 137

[56] References Cited
UNITED STATES PATENTS 3,514,337  5/1970  Braeuer et al. ................. 136/100 R
3,536,532  10/1970  Watanabe et al. ............... 136/121 X
3,700,502  10/1972  Watanabe et al. .......... 136/100 R X

*Primary Examiner*—Anthony Skapars
*Attorney, Agent, or Firm*—Jay H. Quartz; Donald E. Nist

[57] ABSTRACT

A cathode material comprising a fluorinated carbon having the general formula $(CF_x)_n$ where $x$ is greater than 1 and up to and including 2 and where $n$ is an indefinite large number, is described for use in nonaqueous electrolytes wherein the anode material is an electrochemically active metal such as lithium.

7 Claims, 4 Drawing Figures

CATHODE MATERIAL FOR USE IN NON-AQUEOUS ELECTROLYTES

BACKGROUND OF THE INVENTION

This invention relates to primary batteries and, more specifically, to an improved cathode material for use in such batteries utilizing a non-aqueous electrolyte and an anode of an electrochemically active metal.

Because it is possible to produce a small, lightweight cell of high voltage and high energy density using an electrochemically active metal such as lithium in a non-aqueous electrolyte, it is important that the cathode material used in combination with such active anodic materials permit the full realization of the aforementioned battery characteristics. To this end, U.S. Pat. No. 3,536,532, issued Oct. 27, 1970, and entitled "Primary Cell for Electric Batteries" describes a fluorinated carbon for use as a cathode material. The fluorinated carbon is represented by the formula $(CF_x)_n$, where $x$ is not smaller than 0.5 but not larger than 1. As described in that patent at col. 4, lines 3–6, the fluorinated carbons having the aforementioned form cannot be used as the solid active cathode material in the aforedescribed non-aqueous substance if the value of $x$ is greater than 1. Therefore, the energy density of such primary batteries has been limited to theoretical maximums of about 0.86 ampere hours per gram. Thus, there still remains a need for a cathode material for use in non-aqueous electrolytes wherein the anode material is an electrochemically active metal which is able to produce energy densities greater than the aforementioned limit.

SUMMARY OF THE INVENTION

For primary batteries which utilize a non-aqueous electrolyte and an electrochemically active metal, such as lithium, for the anode, it has been found that solid fluorinated carbons having the general formula $(CF_x)_n$, wherein $x$ has a value greater than 1 and up to and including 2, provides superior results to those described by the prior art for fluorinated carbons having the foregoing general formula but wherein $x$ has a value less than 1. This result is quite unexpected in view of the teaching of the prior art that fluorinated carbons which are described herein could not be used in the aforementioned primary batteries.

The herein-described fluorinated carbons permit one to obtain higher energy densities than were produced by the prior art. Additionally, these fluorinated carbon materials, when used in combination with nonaqueous electrolytes and electrochemically active metals, provide satisfactory discharge performance. Furthermore, these fluorinated carbon materials are highly stable so that they permit the presence of some water in the non-aqueous electrolyte without adversely affecting their performance.

DESCRIPTION OF THE PREFERRED EMBODIMENT

Figure 1:
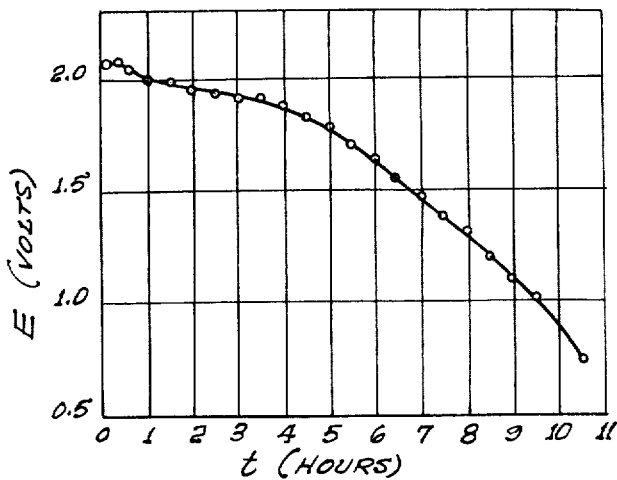
FIGS. 1–4 are graphs of voltage vs. time and show discharge curves for cells employing the compositions of this invention.

The fluorinated carbon cathode material of this invention has the general formula $(CF_x)_n$, where $x$ has a value greater than 1 and up to and including 2 and where n is a large, indefinite number. Preferably, $x$ has a value greater than 1 and up to about 1.3. The reason for the latter preferred limitation is that above this value of $x$, significant amounts of graphite (or other electron conductor) need to be included in the cathode material to offset the insulative effect resulting from the larger fluorine content in the fluorinated carbon. The addition of larger amounts of graphite results in a decrease in the effective energy density.

The fluorinated carbon described herein can be made in several ways as is well known in the art. For example, fluorine gas can be flowed into intimate contact with graphite powder at an elevated temperature, e.g., about 400°–450°C, in the substantial absence of oxygen. The resulting fluorinated carbon powders may be used alone as the cathode material; e.g., when it is suitably held in place by mechanical means such as a conductive paste held in place inside a separator by the pressure of the solid anodes against the separator, or it may be combined with a binder material such as polyethylene, polytetrafluoroethylene or carboxymethylcellulose. If a binding agent is used, it need only be used in small amounts; e.g., 0.5 to 5 percent by weight of the total weight of the cathode. However, it may be used in much larger amounts, e.g., about 50 percent of the total cathode weight, without adversely affecting the performance of the polyfluorinated carbon described herein.

Other additives may be combined with the fluorinated carbon for specific purposes as is well known in the art. For example, acetylene black may be used as an additive to give improved electron conduction within the cathode.

In the primary batteries in which the hereindescribed fluorinated carbon material is used as the active cathode material, the electrolyte is a nonaqueous electrolyte comprising solutes dissolved in suitable solvents as is known in the art. Examples of suitable solutes include: lithium perchlorate; lithium tetrafluoroborate ($LiBF_4$); lithium hexafluoroarsenate ($LiAsF_6$); and lithium aluminum chloride ($LiAlCl_4$). Useful solvents include: butyrolactone; dimethylsulfoxide; acetonitrile; and propylene carbonate. A particularly suitable electrolyte is 1 molar lithium perchlorate in propylene carbonate.

As used herein, the term "non-aqueous electrolyte" includes the use of a non-aqueous liquid with small amounts of water as is known in the art. For example, some "non-aqueous" electrolyte materials include minor amounts of water as an impurity. Such minor amounts of water can be present in the electrolyte because of the excellent stability of the described fluorinated carbons even with respect to water.

The anode material employed in combination with the herein-described cathode material and non-aqueous electrolyte is an electrochemically active metal such as lithium, sodium, and magnesium. Preferably, lithium is used because of its greater activity in the described systems.

The herein-described fluorinated carbons, when used with the described non-aqueous electrolytes and anode materials, enable one to obtain theoretical energy densities on the order of 0.92–0.93 amp. hr./gm. Actual energy densities as high as 0.84 amp. hr./gm have been obtained. In contrast, the use of the fluorinated carbon materials of U.S. Pat. No. 3,536,532 ($x \not> 1$) produces maximum theoretical energy densities of 0.86 amp.

hr./gm. In these cell systems, it is considered to be good if Faradaic efficiencies of 90 percent of the theoretical value can be obtained. Using this rather high percentage of theoretical gives an actual energy density of about 0.77 amp. hr./gm. for the U.S. Pat. No. 3,536,532 patent material which is substantially less than that obtainable with the herein-described fluorinated carbon materials.

Satisfactory discharge performances have also been obtained as described in the examples which follow.

EXAMPLE I

A cathode was made up using 75 percent by weight $(CF_x)_n$ where $x$ had a value of 1.17, 20 percent by weight acetylene black, and 5 percent by weight polytetrafluoroethylene. This cathode was employed in a cell in which the anode was formed from lithium metal and in which the electrolyte was 1 molar lithium perchlorate in propylene carbonate.

This cell was discharged at a current density of 2 ma/cm$^2$. The resulting discharge curve is shown in FIG. 1.

EXAMPLE II

A cathode material was made up using a mixture of polytetrafluoroethylene with sufficient aluminum powder to make the mix electrically conductive. This material was employed as the cathode in a cell in which the anode was lithium and in which the electrolyte was 1 molar LiClO$_4$ in a mixed solvent containing 30 percent by weight propylene carbonate, 40 percent by weight ethylene carbonate, and 30 percent by weight 1,2-dimethoxyethane.

Figure 2:
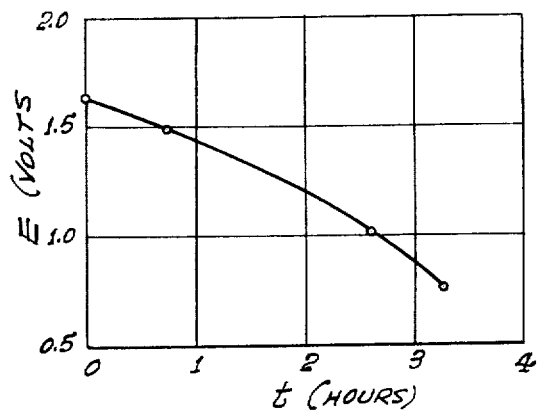

This cell was discharged at 8 $\mu$A/cm$^2$. The resulting discharge curve is shown in FIG. 2.

EXAMPLE III

A cathode material was made up using 80 percent by weight $(CF_{1.17})_n$ (which may also be designated by $(C_{0.86}F)_n$), 17 percent acetylene black, and 3% polytetrafluorethylene. In the cell in which this material was the cathode, the anode was lithium and the electrolyte was 1 molar LiClO$_4$ in a solution of 70 percent (by volume) tetrahydrofuran and 30 percent 1,2-dimethoxyethane.

Figure 3:
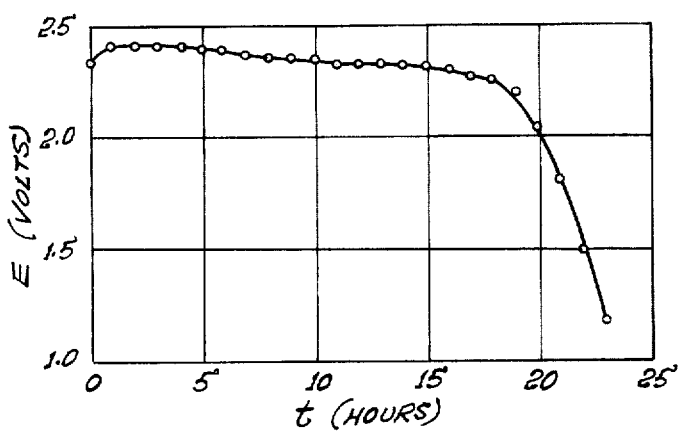

This cell was discharged at a constant 1.5 ma/cm$^2$. The resulting discharge curve is shown in FIG. 3.

EXAMPLE IV

A cathode material was made using 85 percent by weight $(CF_x)_n$, where $x$ had a value 1.22, 10 percent by weight acetylene black, and 5 percent by weight polytetrafluoroethylene. This cathode was employed in a cell in which the anode was formed from lithium metal, and in which the electrolyte was 1 molar lithium perchlorate in a mixed solvent containing 30 percent by weight propylene carbonate, 40 percent by weight ethylene carbonate, and 30 percent by weight 1,2-dimethoxyethane.

Figure 4:
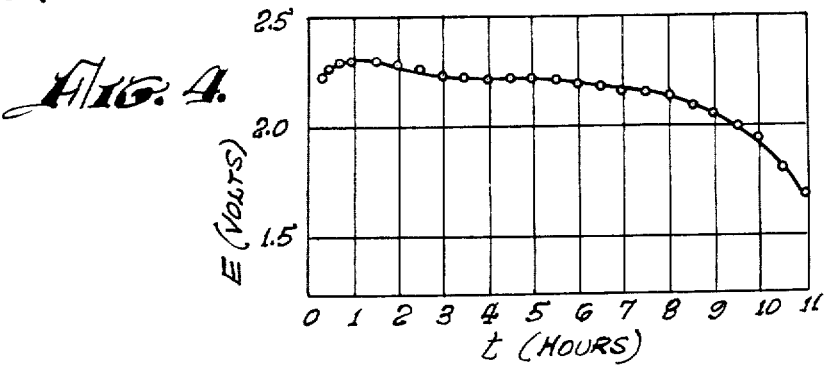

The cell was discharged at a constant 1.5 ma/cm$^2$ current. The results of this discharge are shown in FIG. 4.

I claim:

1. In a primary cell comprising (a) a negative electrode having as the active material an electrochemically active metal and (b) a non-aqueous electrolyte, the improvement which comprises: a positive electrode having as its principal active material a fluorinated carbon represented by the formula $(CF_x)_n$, where $x$ has a value greater than 1 but not greater than 2 and $n$ is an indefinite large number.

2. The positive electrode of claim 1, wherein said $x$ has a value greater than 1 up to about 1.3.

3. The positive electrode of claim 1 which comprises said fluorinated carbon combined with a conductive paste.

4. The positive electrode of claim 1 which comprises said fluorinated carbon admixed with a binding agent.

5. The positive electrode of claim 4 wherein said binding agent is selected from the group consisting of polyethylene, polytetrafluoroethylene, and carboxymethylcellulose.

6. The positive electrode of claim 4 which additionally includes an electron conductor.

7. The positive electrode of claim 4 which includes a major amount by weight of said fluorinated carbon and a minor amount by weight of said binding agent.

* * * * *